INVENTOR:
Günther Laukien

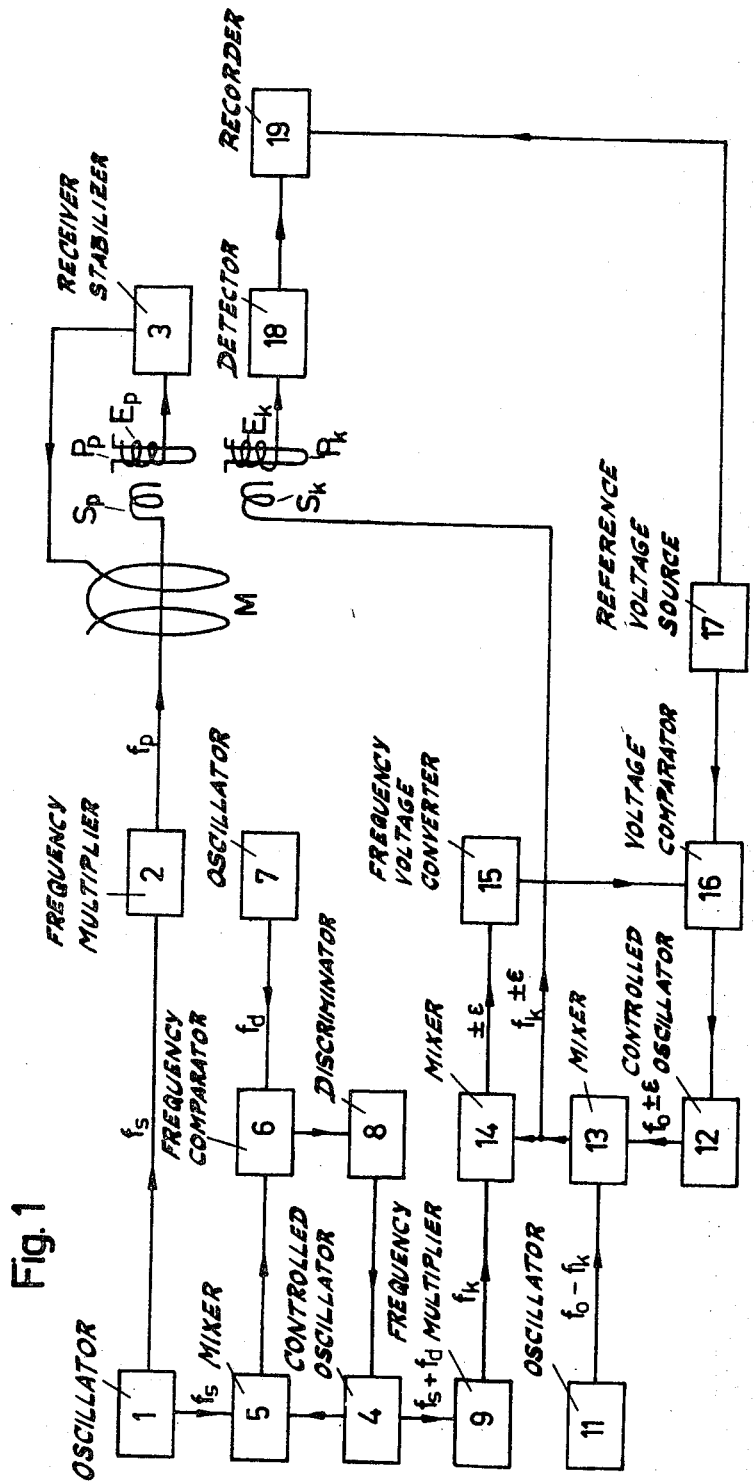

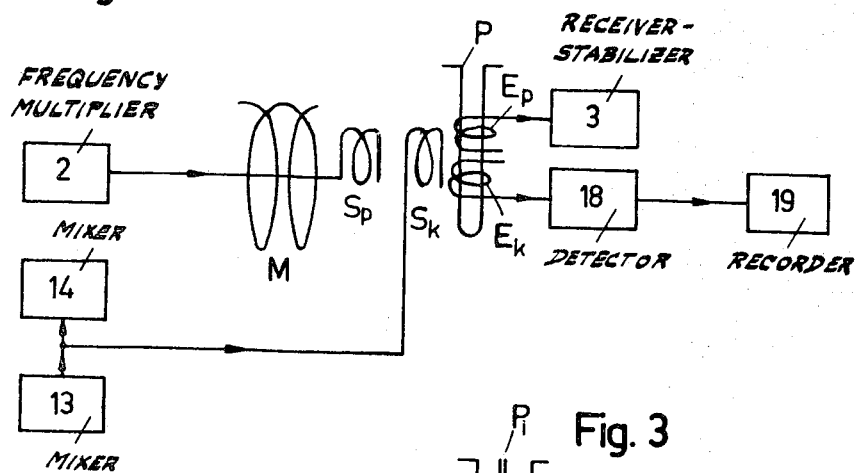
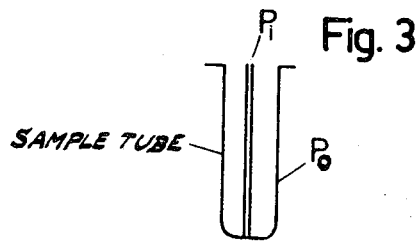
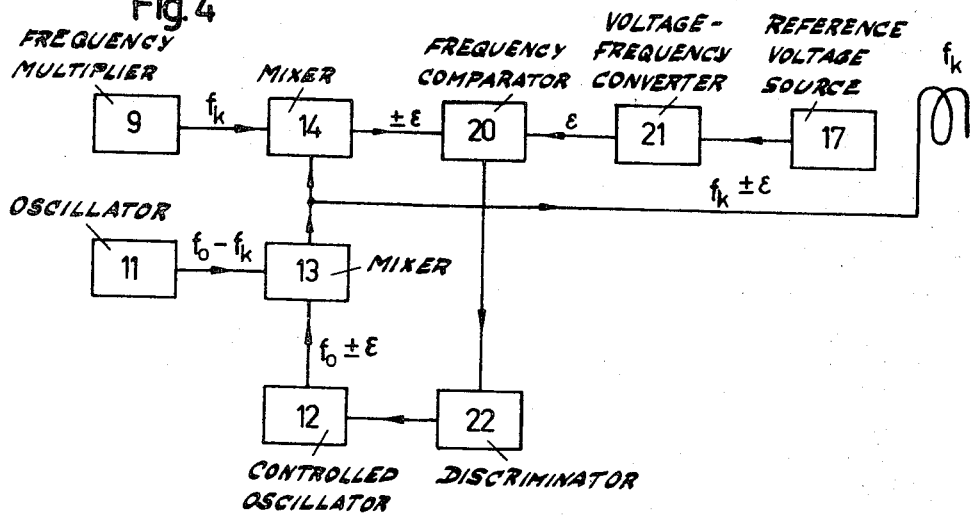

BY Spencer & Kaye
Attorneys

United States Patent Office

3,534,252
Patented Oct. 13, 1970

3,534,252
METHOD AND APPARATUS FOR OBTAINING HIGH RESOLUTION NUCLEAR MAGNETIC RESONANCE SPECTRA
Günther Laukien, Karlsruhe, Forchheim, Germany, assignor to Spectrospin A.G., Zurich, Switzerland
Filed Sept. 16, 1968, Ser. No. 762,245
Claims priority, application Switzerland, Sept. 20, 1967, 13,135/67
Int. Cl. G01n 27/78
U.S. Cl. 324—.5                                17 Claims

ABSTRACT OF THE DISCLOSURE

A method of obtaining high resolution nuclear magnetic resonance spectra for any desired nuclei, and a nuclear magnetic resonance spectrograph for carrying out the method. The method includes the following steps:

Generating a first signal of frequency $f_s$; multipling frequency $f_s$ by a whole number to obtain a second signal having the proton resonance frequency $f_p$ for a given magnetic field $H_0$; stabilizing the magnetic field $H_0$ by proton resonance with the second signal; mixing a third signal having a frequency $f_d$ which is small compared to the frequency $f_s$ with the first signal to obtain a fourth signal having a frequency $f_s+f_d$; multiplying the frequencies $f_s+f_d$ by a whole number to obtain a fifth signal having the frequency $f_k$ and utilizing this fifth signal to obtain nuclear magnetic resonance spectra of the desired nuclei.

BACKGROUND OF THE INVENTION

The present invention relates to a method for obtaining high resulution nuclear magnetic resonance spectra of any desired nuclei and a nuclear magnetic resonance spectrograph to carry out the method.

High resolution magnetic resonance spectra of protons are presently normally obtained with apparatus which utilizes nuclear resonance to stabilize the magnetic field. In a particular apparatus of this type, which is described in U.S. Pat. No. 3,435,333 to Wegmann et al., issued Mar. 25, 1969, the magnetic field is stabilized by nuclear resonance to a fixed frequency $f$ while a signal having a variable frequency $f\pm\epsilon$ is applied to appropriate transmitter coils in the region of the magnentic field to produce the spectrum.

This technique of obtaining nuclear magnetic resonance spectra can be employed not only for protons, but for other nuclei as well. However, if other nuclei are tested, the natural line width in the spectra will usually be considerably greater than with protons and therefore the stabilization will be corresponding less exact.

A further difficulty also arises when using the apparatus of the type described above on nuclei other than protons. Because the "chemical shift" is substantially greater with these other nuclei than it is with protons, the frequency sweep required for the variable frequency must be very large. However, since this variable frequency must, on one hand, be coupled with the fixed frequency $f$ and, on the other hand, must sweep in a linear manner, it is not possible, technically, to realize this large frequency sweep in any simple manner.

It is reasonable to assume that the magnetic field of a nuclear magnetic resonance spectrograph might be stabilized by proton resonance while the nuclear magneic resonance spectra of another type of nuclei is obtained at another frequency by varying this other frequency to produce the sweep. However, if this is done, the main advantage of the proton resonance stabilization will be lost since the proton frequency and this other frequency will be independent of each other.

SUMMARY OF THE INVENTION

It is, therefore, an object of the present invention to utilize proton resonance for stabilizing the magnetic field of a nuclear magnetic resonance spectrograph that is capable of obtaining high resolution magnetic resonance spectra for any desired nuclei by coupling the frequency used to obtain high resolution nuclear magnetic resonance spectra with the proton resonance frequency used to stabilize the magnetic field.

It is a still further object of the present invention to generate large sweeps in the frequency used to obtain nuclear magneic resonance spectra in a spectrograph of the type described above.

These objects, as well as other objects which will become apparent in the discussion that follows, are achieved, according to the present invention, by generating a first signal having a standard frequency $f_s$;

Multiplying this standard frequency $f_s$ by a whole number to obtain a second signal having the proton resonance frequency $f_p$ for a given magnetic field $H_0$ of a nuclear magnetic resonance spectrograph;

Stabilizing the magnetic field $H_0$ by proton resonance with the second signal;

Mixing a third signal having a frequency $f_d$, which is small compared to the frequency $f_s$, with the first signal to obtain a fourth signal having a frequency $f_s+f_d$;

Multiplying the frequency $f_s+f_d$ by a whole number to obtain a fifth signal having a frequency $f_k$; and Utilizing this fifth signal to obtain the nuclear magnetic resonance spectrum of any desired nuclei.

By proper choice of the frequencies $f_s$ and $f_d$ and of the whole number by which the frequency $f_s+f_d$ is multiplied, the frequency $f_k$, which is now coupled with the proton resonance frequency $f_p$, may be set equal to the median magnetic resonance frequency of any desired nuclei.

The necessary positive and negative frequency sweep can be added to the frequency $f_k$ by generating a sixth signal having a frequency $f_0\pm\epsilon$ where $\epsilon$ is the sweep frequency necessary to obtain the nuclear magnetic resonance spectra and $f_0$ has a value at least in order of magnitude as large as the proton resonance frequency $f_p$; generating a seventh signal having the frequency $f_0-f_k$ and mixing the sixth signal with the seventh signal to produce an eighth signal having the frequency $f_k\pm\epsilon$. This eighth signal can then be applied to suitable transmitter coils in the region of the sample tube containing the desired nuclei to obtain the nuclear magneic resonance spectra. The fifth signal may finally be used to stabilize this frequency $f_k\pm\epsilon$ of the eighth signal.

BRIEF DESCRIPTION OF THE DRAWINGS

FIG. 1 is a block diagram of a nuclear magnetic resonance spectrograph according to one preferred embodiment of the present invention.

FIG. 2 is a block diagram of a portion of a nuclear magnetic resonance spectrograph according to another preferred embodiment of the present invention.

FIG. 3 is a representational diagram of a sample tube according to a preferred embodiment of the present invention.

FIG. 4 is a block diagram of a portion of a nuclear magnetic resonance spectrograph according to still another embodiment of the present invention.

DESCRIPTION OF THE PREFERRED EMBODIMENTS

Figure 5:
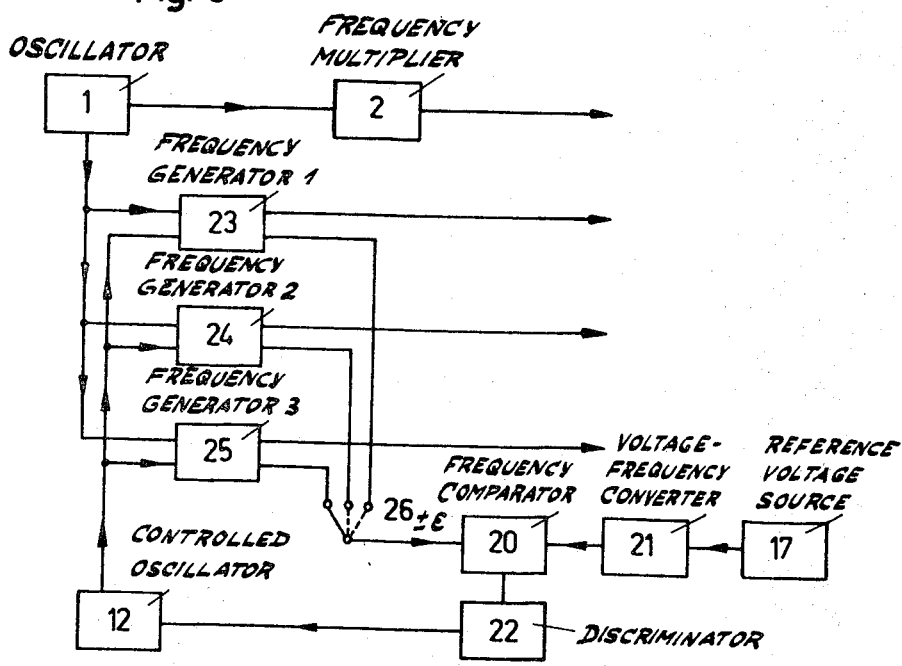
FIG. 5 is a block diagram of a portion of a nuclear magnetic resonance spectrograph according to a still further embodiment of the present invention.

Referring now to the drawings, there is shown in FIG. 1 a first preferred embodiment of the present invention. This figure illustrates nuclear magnetic resonance spectrograph apparatus having a probe head in which two, preferably rotating, samples are arranged between the poles of a magnetic in the manner well known in the art. The sample tube $P_p$ contains protons (in the form of water, for example) and is surrounded by a receiver coil $E_p$ and two or more transmitter coils $S_p$. The sample tube $P_k$, which contains the substance to be tested, is surrounded by the receiver coil $E_k$ and by two or more transmitter coils $S_k$. The magnet which is also present, but not shown for reasons of clarity, has a winding M which can either serve to generate the field, in the case of an electromagnet, or can serve as a field stabilization winding in either an electro or a permanent magnet (field-flux stabilization).

The electronic equipment associated with the nuclear magnetic resonance spectrograph is constructed and operates as follows: A signal generator 1 (such as a thermally stabilized quartz oscillator) generates a signal having the frequency $f_s$. The frequency of the signal is multiplied by the factor $n$ in a frequency multiplier 2 to produce the frequency $f_p$. This frequency $f_p$ corresponds to the proton resonance frequency for a certain magnetic field $H_0$. The output of the frequency multiplier 2 is supplied to the transmitter coils $S_p$. The protons in the sample tube $P_p$ are thus stimulated to proton resonance and produce a resonance signal which is detected by the receiver coil $E_p$ and passed to a receiver-stabilizer device 3. Here the received signal is amplified, demodulated, passed through a phase sensitive rectifier and utilized, in the manner well known in the art, to stabilize the magnetic field for an extended time. This magnetic field is also prestabilized by additional apparatus, not shown, which is well known in the art.

A controlled oscillator 4 generates a signal having the frequency $f_s+f_d$ where $f_d$ is small compared to $f_s$. The signal is mixed in a mixer stage 5 with the signal of frequency $f_s$ produced by the oscillator 1. The resulting signal, which has a frequency $f_d$, is compared in a phase sensitive detector 6 with another signal of frequency $f_d$ produced by a highly stable oscillator 7. The output of the phase sensitive detector 6 is employed by a discriminator 8 to stabilize the frequency $f_s+f_d$ in the manner well known in the art.

The signal with the stabilized frequency $f_s+f_d$ passed to an additional frequency multiplier 9 which multiplies this frequency by a factor $m$. The output of this frequency multiplier will therefore have a stabilized frequency $f_k$ which is dependent upon the frequency $f_s$. This frequency $f_k$ should correspond to the median nuclear magnetic resonance frequency of the atomic nuclei in the sample $P_k$ which are to be tested. The relative stability of $f_k$ with respect to $f_p$—an important factor in the operation of the entire apparatus—is increasingly improved, the greater the ratio $f_s:f_d$.

A second controlled oscillator 12 generates a signal with the frequency $f_0 \pm \epsilon$. A second stabilized quartz oscillator 11 generates a further signal with the frequency $f_0-f_k$. These two signals are mixed in a stage 13 to produce a signal with the variable frequency $f_k \pm \epsilon$.

This signal from the mixing stage 13 is passed to another mixing stage 14 as is the signal having the frequency $f_k = m(f_s+f_d)$. The output of this mixing stage 14 is a signal having a frequency of approximately $\epsilon$ but containing the deviations between the two separately generated frequencies $f_k$.

This frequency $\epsilon$ is converted to a voltage in a frequency-voltage conversion stage 15 and this voltage applied to a comparison stage 16 where it is compared with an adjustable reference voltage produced by a controlled source 17. The difference between these two voltages is utilized to regulate the oscillator 12 so that the actual value of the frequency $\epsilon$ will be corrected to correspond to a desired value. This desired value of the frequency $\epsilon$ may therefore be changed by suitably controlling the reference voltage 17.

The frequency $f_k \pm \epsilon$ will also be corrected through the regulation of the frequency $\epsilon$. The output signal of the mixer stage 13 which contains this frequency may then be applied to the transmitter coils $S_k$. The nuclear magnetic resonance signal of the nuclei in the sample tube $P_k$ will be received by the receiver coil $E_k$ and may be applied, via a nuclear magnetic resonance detector 18, to the ordinates of a recording instrument 19. One of the abscissa of the recorder 19 may, for example, be controlled or calibrated by the reference voltage produced by the source 17.

The controllable oscillators 4 and 12 are preferably constructed, in the manner well known in the art, as stretchable quartz oscillators. These oscillators can be stabilized against temporary variations in the frequency. If it is desired to control the frequencies over a relatively wide range for extended lengths of time, the oscillators may be provided, for example, with a varicap control (variable capacitance).

The apparatus of FIG. 1 may be operated in the following manner, for example, to obtain the nuclear magnetic resontnce spectra of $C^{13}$. The frequency $f_s$ is chosen to equal 1 mHz. and $m$ is chosen as 90, so that the proton frequency $f_p=90$ mHz. corresponds to a field of approximately 21,000 gauss. The median frequency of the $C^{13}$ nuclear magnetic spectra at the same field is 22.62 mHz. The frequency $f_d$ is now chosen to equal $0.62/22=0.0282$ mHz. $(f_s+f_d)$ will now equal 1.0282 mHz. and $m$ $(f_s+f_d)=f_k=22.62$ mHz. $f_0$ is chosen to be 100 mHz. $\epsilon$ is directly realizable only in a range $\pm$ 100 p.p.m.; that is, $\pm$ 10 kHz. $f_0-f_k$ will be 77.38 mHz. and $f_k \pm \epsilon=22.62$ mHz. $\pm$ 10 kHz. The $C^{13}$ frequency will thus be proton stabilized and the frequency swing of the sweep frequency will be $\pm 10,000/22.62$ mHz.$=\pm 500$ p.p.m. It is therefore possible, according to the present invention, to achieve a frequency sweep which matches the substantially greater chemical shift in the $C^{13}$ spectrum. The frequency of every other nucleus can also be matched in the same manner. The higher is chosen the frequency $f_0$ and the lower the frequency $f_k$, the greater will be the frequency swing of the sweep frequency, expressed in p.p.m. (parts per million).

If $f_k$ is chosen to equal $f_p$ the same apparatus may be used to obtain proton stabilized proton spectra.

Another embodiment of the apparatus according to the present invention is illustrated in FIG. 2. Since the electronic equipment used with this embodiment is the same as that illustrated and described in connection with FIG. 1, this apparatus has not been reillustrated here. However, in this embodiment, the two sample tubes arranged in the magnetic field in the embodiment of FIG. 1 have been replaced by a single sample tube P. The receiver coils $E_p$ and $E_k$ are wound around this sample tube either next to or one on top of the other. The pair of transmitter coils $S_p$ and $S_k$ are likewise arranged on a common axis which is perpendicular to the magnetic field and perpendicular to the axis of the receiver coils. The sample tube contains the substance to be tested having the atomic nuclei $k$ as well as protons. The protons may be either contained in the substance to be tested or mixed in the sample as an "internal standard" in the form of a proton containing liquid.

FIG. 3 illustrates a particular embodiment of the sample tube which may be used alternatively with the embodiment of FIG. 2. This sample tube consists of two concentric tubes: an inner tube $P_i$ which contains the proton standard liquid and an outer tube $P_0$ containing the substance to be tested. Since the apparatus is considerably more sensitive for protons than for other nuclei, the inner tube $P_i$ can be made very thin.

FIG. 4 illustrates a particular embodiment of the present invention which employs a voltage-frequency converter in place of the frequency-voltage converter of FIG. 1. The frequencies $f_k$, $f_0 \pm \epsilon$ and $f_0 - f_k$ are generated in the manner shown and described in connection with FIG. 1. The signals containing the frequencies $f_0 - f_k$ and $f_0 \pm \epsilon$ are likewise mixed in stage 13 and the frequencies $f_k$ and $f_k \pm \epsilon$ mixed in the stage 14 in the manner of FIG. 1. However, in this embodiment the reference voltage produced by the source 17 is applied to a voltage-frequency converter 21 which produces a signal with a frequency $\epsilon$. This signal is compared with the signal of frequency $\pm \epsilon$ supplied by the mixer 14 in a phase sensitive detector 20 and the resulting difference signal is passed through a discriminator 22 to regulate the oscillator 12.

This embodiment has the advantage, compared to the circuit of FIG. 1 described above, that the converter is not arranged directly in the feedback path (elements 12, 13, 14, 20, 22 and 12) and that the frequency comparison carried out in stage 20 is less subject to interference than is the voltage comparison of stage 16.

FIG. 5 illustrates a still further embodiment of a nuclear magnetic resonance spectrograph according to the present invention. This spectrograph may be selectively switched to obtain high resolution, proton stabilized nuclear magnetic spectra of several types of nuclei.

The oscillators 1 and 12 as well as the stages 15, 16, and 17 of FIG. 1 or stages 17, 20, 21 and 22 of FIG. 4 for generating the variable sweep frequency are used in common for all the frequencies which this embodiment is intended to produce. Although the voltage-frequency converter embodiment of FIG. 4 is illustrated in FIG. 5, it will be understood that the frequency-voltage converter embodiment of FIG. 1 may be used as well.

Every frequency producible by this embodiment requires separate stages 4 to 9, 11, 13 and 14. In FIG. 5, for example, the stages for these such frequencies are combined into three separate blocks 23, 24 and 25. At least the line carrying the signal of frequency $\epsilon$ is connected to the detector 20 through a selector switch 26. The output signals having the different frequencies of each block 23, 24 and 25 are supplied to exchangeable elements in the probe head of the spectrograph in the manner known in the art.

The number of frequencies producible by the apparatus shown in FIG. 5 is not limited to three but can be increased to any number required.

If the nuclear magnetic spectrograph according to the present invention is also to serve to obtain proton stabilized proton spectra, one of the frequencies $f_k$ in the embodiment of FIG. 5 should be chosen to equal $f_p$ by making $f_d = 0$ and $m = n$.

Figure 6:
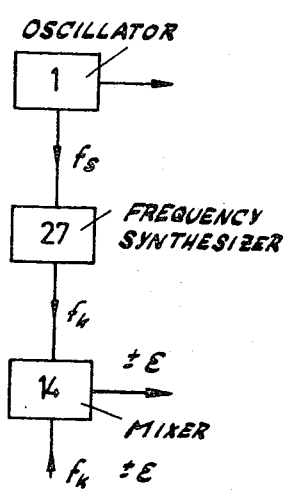
FIG. 6 is a block diagram of a portion of a nuclear magnetic resonance spectrograph according to a still further embodiment of the present invention.

A still further embodiment of the present invention is illustrated in FIG. 6. Here the addition of the frequency $f_d$ as well as the multiplication by $m$ is carried out by a well known electronic circuit called a "frequency synthesizer" 27. This device operates to separate the frequency $f_e$ into a great number of small partial frequencies, a desired number of which can be added to the frequency $f_s$ and then further multiplied by a desired number. By suitably choosing the partial frequencies as small frequencies $f_d$, and the suitable choice of $m$ as the multiplication factor for the sum frequency, it is possible to obtain any desired frequency $f_k$. The other circuit elements in the embodiment of FIG. 6 can remain the same as in the embodiments of FIG. 1 or FIG. 4. Only the oscillator 11 which generates the signal at the frequency $f_0 - f_k$ must be changed over or adapted to this embodiment.

Figure 7:
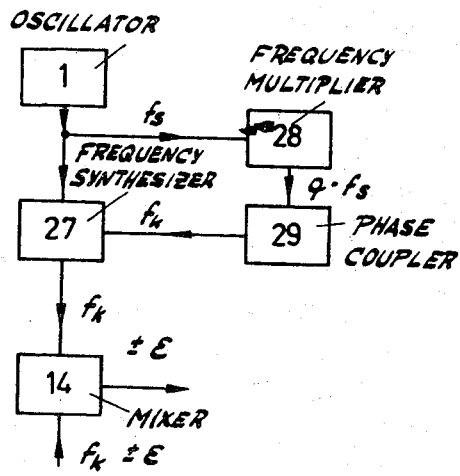
FIG. 7 is a block diagram of a modification of the nuclear magnetic resonance spectrograph of FIG. 6.

FIG. 7 illustrates an advantageous modification of the circuit embodiment of FIG. 6. In this circuit the frequency $f_s$ of the signal generated by the oscillator 1 is multiplied by a factor $q$ in the multiplier 28 to bring it to a frequency $q \cdot f_s$ which is near the output frequency $f_k$ of the frequency synthesizer 27. The block 29 contains a circuit of the type illustrated in FIG. 1 as elements 4, 5, 6, 7 and 8 wherein the frequency $f_d$ of the oscillator 7 is chosen to equal the difference $q \cdot (f_s - f_k)$. The phase of the output frequency $f_k$ of the frequency synthesizer 27 is coupled, in this way, with the phase of the standard frequency $f_s$ to prevent a drift in the frequency by shift in phase.

It will be understood that the above description of the present embodiment is susceptible to various modifications, changes and adaptations.

I claim:
1. A method for obtaining high resolution nuclear/magnetic resonance spectra for any desired nuclei, comprising the steps of:
  (a) generating a first signal having a standard frequency $f_s$;
  (b) multiplying said standard frequency $f_s$ by a whole number to obtain a second signal having the proton resonance frequency $f_p$ for a given polarizing magnetic field $H_0$ of a nuclear magnetic resonance spectrograph;
  (c) utilizing said second signal to produce a high frequency alternating magnetic field, which is applied to a control sample in the said polarizing field $H_0$;
  (d) sensing the resonant condition of the control sample and using the signal produced to control and stabilize the polarizing field $H_0$;
  (e) mixing a third signal having a frequency $f_d$, said frequency $f_d$ being small compared to said frequency $f_s$, with said first signal to obtain a fourth signal having a frequency $f_s + f_d$;
  (f) multiplying said frequency $f_s + f_d$ by a whole number to obtain a fifth signal having the frequency $f_k$;
  (g) generating a sixth signal having a frequency $f^* \pm \epsilon$, where $\epsilon$ is the sweep frequency necessary to obtain the nuclear magnetic resonance spectra and $f_0$ has a value at least in order of magnitude as large as said proton resonance frequency $f_p$;
  (h) generating a seventh signal having the frequency $f_0 - f_k$;
  (i) mixing said sixth signal with said seventh signal to produce an eighth signal having the frequency $f_k \pm \epsilon$;
  (j) stabilizing the frequency of said eighth signal by comparing it with the frequency of said fifth signal;
  (k) utilizing the eighth signal to produce a swept frequency alternating magnetic field which is applied to the sample under test in the polarizing field; and
  (l) sensing and indicating the resonance signal of the sample while the frequency is swept.

2. In a nuclear magnetic resonance spectograph having magnetic means for generating a magnetic field $H_0$, the improvement comprising, in combination:
  (a) first means for generating a first signal having a standard frequency $f_s$;
  (b) second means, connected to said first means, for multiplying the frequency of said first signal by a whole number and producing a second signal having the proton resonance frequency $f_p$ at said magnetic field $H_0$;
  (c) third means, connected to said second means for producing by said second signal a high frequency alternating magnetic field, applied to a control sample in said magnetic field $H_0$;
  (d) fourth means for sensing and detecting the resonance signal produced by the control sample and for stabilizing said magnetic field $H_0$ by applying said resonance signal to said stabilizing means;
  (e) fifth means, connected to said first means, for generating a third signal having a frequency $f_d$, said frequency $f_d$ being small compared to frequency $f_s$, and mixing said third signal with said first signal to produce a fourth signal having a frequency $f_s + f_d$;

(f) sixth means, connected to said fifth means, for multiplying the frequency of said fourth signal by a whole number to produce a fifth signal having a frequency $f_k$;

(g) seventh means for generating a sixth signal having a frequency $f_0 \pm \epsilon$ where $\epsilon$ is the sweep frequency necessary to obtain the nuclear magnetic resonance spectrum of said nuclei and $f_0$ has a value at least in order of magnitude as large as said proton resonance frequency $f_p$;

(h) eighth means for generating a seventh signal having the frequency $f_0 - f_k$;

(i) ninth means, connected to said seventh means and said eighth means for mixing said sixth signal with said seventh signal to produce an eighth signal having the frequency $f_k \pm \epsilon$;

(j) tenth means, connected to said sixth means and to said ninth means, for stabilizing the frequency of said eighth signal by comparing it with said fifth signal;

(k) eleventh means, connected to said ninth means, for producing an alternating magnetic field with swept frequency by said eighth signal and for applying it to a test probe within the magnetic field $H_0$; and (l) twelfth means for sensing, detecting and registering the resonance signal of said test probe while sweeping the frequency.

3. The improvement defined in claim 2, wherein said third means includes first transmitter coil means, connected to said second means for producing magnetic resonance in protons, first receiver coil means for sensing said proton resonance, and stabilizer means, connected to said receiver coil means and to said magnet means, for stabilizing said magnetic field $H_0$.

4. The improvement defined in claim 3, wherein said sixth means further includes second transmitter coil means, connected to said ninth means, for producing magnetic resonance in said nuclei with said eighth signal, second receiver coil means for sensing said nuclear magnetic resonance means, connected to said second receiver coil means, for detecting and recording the nuclear magnetic resonance spectrum of said nuclei.

5. The improvement defined in claim 4, wherein said eighth means is a stable quartz oscillator.

6. The improvement defined in claim 5, wherein said seventh means is an oscillator, the frequency of said oscillator being controllable in a range of about ±100 p.p.m.

7. The improvement defined in claim 6, wherein said tenth means includes:

(i) thirteenth means, connected to said fifth means and said ninth means, for mixing said fifth signal and said eighth signal to produce a ninth signal having the frequency $\pm \epsilon$;

(ii) fourteenth means, connected to said eleventh means, for converting said ninth signal into a first voltage representative of the frequency of said ninth signal; and (iii) fifteenth means, connected to said twelfth means and to said seventh means, for comparing said first voltage with a second adjustable reference voltage, and for producing an error signal for controlling the frequency of said sixth signal generated by said seventh means.

8. The improvement defined in claim 2, wherein the frequency $f_k$ of said fifth signal is the same as the frequency $f_p$ of said second signal, whereby said spectrograph is operative to obtain the nuclear magnetic resonance spectra of protons.

9. The improvement defined in claim 4, further comprising sample tube means arranged in the vicinity of said first and second transmitter coil means, and said first and second receiver coil means.

10. The improvement defined in claim 9, wherein said sample tube means is surrounded by said first and second transmitter coil means and said first and second receiver coil means, and said sample tube means includes two concentric sample containers.

11. The improvement defined in claim 4, comprising first sample tube means, containing said protons, arranged in the vicinity of said first transmitter and first receiver coil means, and second sample tube means, containing said nuclei, arranged in the vicinity of said second transmitter and second receiver coil means.

12. The improvement defined in claim 6, wherein said tenth means includes:

(i) thirteenth means, connected to said fifth means and said ninth means, for mixing said fifth signal and said eighth signal to produce a ninth signal having the frequency $\pm \epsilon$;

(ii) sixteenth means for converting a third adjustable reference voltage into a tenth signal having a frequency $\epsilon$ and representative of said third voltage;

(iii) seventeenth means, connected to said thirteenth means and said sixteenth means, for comparing the frequencies of said ninth and tenth signals and for producing an eleventh signal representative of the difference in frequency; and (iv) discriminator means, connected to said seventeenth means and to said seventh means, for producing an error signal from said eleventh signal for controlling the frequency of said sixth signal generated by said seventh means.

13. The improvement defined in claim 12, wherein said seventeenth means is a phase-sensitive detector.

14. The improvement defined in claim 2, wherein said fourth and fifth means produce a plurality of said fifth signals each fifth signal having a different frequency and each frequency being the median magnetic resonance frequency for particular nuclei, whereby said plurality of fifth signals may be utilized to produce the nuclear magnetic spectrum of a plurality of different nuclei.

15. The improvement defined in claim 14, wherein the frequency of one of said plurality of fifth signals is the proton resonance frequency $f_p$.

16. The improvement defined in claim 2, wherein said fourth and fifth means include frequency synthesizer means for mixing said third signal with said first signal and multiplying the frequency of the resulting signal to produce said fifth signal.

17. The improvement defined in claim 16, wherein said fourth and fifth means include means for coupling the phase of said fifth signal with the phase of said first signal.

References Cited

UNITED STATES PATENTS 3,435,333   3/1969   Wegmann _____ 324—.5

OTHER REFERENCES

E. B. Baker and L. W. Burd: Frequency Swept and Proton Stabilized NMR Spectrometer For All Nuclei Using a Frequency Synthesizer, Rev. Sci. Instr., 34(3), March 1963, pp. 238–243.

RUDOLPH V. ROLINEC, Primary Examiner

M. J. LYNCH, Assistant Examiner